(12) United States Patent
Millington (10) Patent No.: US 9,140,572 B2
(45) Date of Patent: Sep. 22, 2015

(54) METHODS FOR CONTROLLING A NAVIGATION SYSTEM

(75) Inventor: Jeffrey A. Millington, Rochester Hills, MI (US)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1359 days.

(21) Appl. No.: 12/030,631

(22) Filed: Feb. 13, 2008

(65) Prior Publication Data

US 2008/0201662 A1    Aug. 21, 2008

(30) Foreign Application Priority Data

Feb. 13, 2007   (EP) .................................... 07003018

(51) Int. Cl.
  *G06F 3/023*    (2006.01)
  *G01C 21/36*    (2006.01)
  *G06F 3/0338*   (2013.01)
  *G06F 3/0482*   (2013.01)

(52) U.S. Cl.
  CPC .......... *G01C 21/3611* (2013.01); *G06F 3/0236* (2013.01); *G06F 3/0338* (2013.01); *G06F 3/0482* (2013.01)

(58) Field of Classification Search
  CPC ............ G01C 21/3611; G01C 21/3664; G06F 3/0236; G06F 3/0482; G06F 3/0338
  USPC ............................ 715/810–845, 773; 345/689
  See application file for complete search history.

(56) References Cited

U.S. PATENT DOCUMENTS

| | | | |
|---|---|---|---|
| 5,191,532 A | 3/1993 | Moroto et al. | |
| 5,436,954 A * | 7/1995 | Nishiyama et al. | 455/566 |
| 5,543,818 A * | 8/1996 | Scott | 345/168 |
| 5,953,541 A * | 9/1999 | King et al. | 710/67 |
| 5,999,895 A * | 12/1999 | Forest | 704/1 |
| 6,037,942 A * | 3/2000 | Millington | 715/835 |
| 6,088,649 A * | 7/2000 | Kadaba et al. | 701/201 |
| 6,104,381 A * | 8/2000 | Watanabe et al. | 345/160 |
| 6,141,011 A * | 10/2000 | Bodnar et al. | 715/812 |
| 6,144,378 A * | 11/2000 | Lee | 715/767 |
| 6,256,029 B1 * | 7/2001 | Millington | 715/841 |
| 6,271,835 B1 * | 8/2001 | Hoeksma | 345/168 |
| 6,307,549 B1 * | 10/2001 | King et al. | 715/810 |
| 6,374,180 B1 * | 4/2002 | Slominski et al. | 701/208 |
| 6,392,640 B1 * | 5/2002 | Will | 345/184 |
| 6,580,414 B1 * | 6/2003 | Wergen et al. | 345/156 |

(Continued)

FOREIGN PATENT DOCUMENTS

EP    0 893 750 A1    1/1999

OTHER PUBLICATIONS

Magellan; Magellan RoadMate Reference Manual; Instructions for Operating the Magellan RoadMate 360.

*Primary Examiner* — Amy Ng
*Assistant Examiner* — William Wong
(74) *Attorney, Agent, or Firm* — Alleman Hall McCoy Russell & Tuttle LLP (57) ABSTRACT

Methods for inputting a destination in a navigation system by manually controlling an actuating device are provided. In an example method, at least the following menu items can be selected when the actuating device is actuated using a first motion type: a CHARACTER menu item provides a list of characters when selected, and a DIGIT menu item that provides a list of digits when selected. The first motion type may be used to actuate the actuating device to select one of the other non-selected menu items.

12 Claims, 6 Drawing Sheets

(56) References Cited

U.S. PATENT DOCUMENTS

| | | | |
|---|---|---|---|
| 6,636,197 B1* | 10/2003 | Goldenberg et al. | 345/156 |
| 6,661,920 B1* | 12/2003 | Skinner | 382/187 |
| 6,711,499 B2* | 3/2004 | Millington | 701/211 |
| 6,765,554 B2* | 7/2004 | Millington | 345/156 |
| 6,812,940 B2* | 11/2004 | Arnold | 715/817 |
| 6,873,907 B1* | 3/2005 | Millington et al. | 701/209 |
| 6,897,849 B2* | 5/2005 | Kim | 345/160 |
| 7,015,899 B2* | 3/2006 | Kim | 345/169 |
| 7,088,340 B2* | 8/2006 | Kato | 345/168 |
| 7,116,317 B2* | 10/2006 | Gregorio et al. | 345/184 |
| 7,164,410 B2* | 1/2007 | Kupka | 345/156 |
| 7,170,497 B2* | 1/2007 | Husgafvel et al. | 345/172 |
| 7,286,115 B2* | 10/2007 | Longe et al. | 345/168 |
| 7,574,672 B2* | 8/2009 | Jobs et al. | 715/830 |
| 2001/0045937 A1* | 11/2001 | Hagiwara et al. | 345/156 |
| 2002/0000978 A1* | 1/2002 | Gerpheide | 345/173 |
| 2002/0054153 A1* | 5/2002 | Arnold | 345/810 |
| 2002/0063687 A1* | 5/2002 | Kim | 345/160 |
| 2002/0067335 A1* | 6/2002 | Millington | 345/156 |
| 2002/0067352 A1* | 6/2002 | Takeuchi | 345/204 |
| 2002/0087267 A1* | 7/2002 | Millington | 701/211 |
| 2002/0089435 A1* | 7/2002 | Hanamoto et al. | 341/20 |
| 2002/0122031 A1* | 9/2002 | Maglio et al. | 345/184 |
| 2003/0001816 A1* | 1/2003 | Badarneh | 345/156 |
| 2003/0013493 A1* | 1/2003 | Irimajiri et al. | 455/566 |
| 2003/0105576 A1* | 6/2003 | Kamiya et al. | 701/102 |
| 2003/0197736 A1* | 10/2003 | Murphy | 345/780 |
| 2004/0012361 A1* | 1/2004 | Gaertner et al. | 318/567 |
| 2004/0048607 A1* | 3/2004 | Kim | 455/418 |
| 2004/0095393 A1* | 5/2004 | Anson | 345/773 |
| 2004/0155905 A1* | 8/2004 | Arai | 345/773 |
| 2005/0117044 A1* | 6/2005 | Suto | 348/333.12 |
| 2005/0134572 A1* | 6/2005 | Anson | 345/169 |
| 2005/0168452 A1* | 8/2005 | Sunadome | 345/184 |
| 2005/0219207 A1* | 10/2005 | Shishido et al. | 345/156 |
| 2005/0240879 A1* | 10/2005 | Law et al. | 715/773 |
| 2006/0010395 A1* | 1/2006 | Aaltonen | 715/779 |
| 2006/0095844 A1* | 5/2006 | Van Leeuwen | 715/700 |
| 2006/0123354 A1* | 6/2006 | Volovitz | 715/780 |
| 2006/0132469 A1* | 6/2006 | Lai et al. | 345/184 |
| 2006/0282791 A1* | 12/2006 | Bogomolov et al. | 715/773 |
| 2007/0079239 A1* | 4/2007 | Ghassabian | 715/707 |
| 2007/0080949 A1* | 4/2007 | Chung et al. | 345/169 |
| 2007/0126703 A1* | 6/2007 | Griffin et al. | 345/169 |
| 2007/0186159 A1* | 8/2007 | Yang | 715/535 |
| 2007/0205920 A1* | 9/2007 | Cho | 341/35 |
| 2007/0271528 A1* | 11/2007 | Park et al. | 715/810 |
| 2007/0294636 A1* | 12/2007 | Sullivan | 715/810 |
| 2008/0115078 A1* | 5/2008 | Girgaonkar | 715/773 |
| 2009/0097753 A1* | 4/2009 | Millington | 382/187 |

* cited by examiner

METHODS FOR CONTROLLING A NAVIGATION SYSTEM

RELATED APPLICATIONS

This application claims priority of European Patent Application Ser. No. 07 003 018.4, filed on Feb. 13, 2007, titled METHOD FOR INPUTTING A DESTINATION IN A NAVIGATION UNIT AND A NAVIGATION THEREFOR, which application is incorporated by reference in its entirety in this application.

BACKGROUND OF THE INVENTION

1. Field of the Invention

This invention relates to navigation systems, and more particularly, to systems and methods for controlling navigation systems.

2. Related Art

Navigation systems are finding increasingly common use in vehicles for guiding the driver from a present vehicle position to a predetermined destination. Navigation systems employ different ways of inputting destinations into the navigation system. In some navigation systems, a haptic actuating device is used for manually inputting different characters and digits. In voice-controlled navigation systems, the driver may utter a voice command containing the destination. In examples that use a manual input of the destination, the steps required to enter a destination using a haptic input device typically involve inputting several characters to spell the desired street or city of the destination. The process of selecting each character typically involves multiple button presses or multiple other activations of an actuating device. The amount of effort required to specify the street name, city name and house number may take a substantial amount of time for the driver. One problem is that the organization of the speller impacts the number of steps needed to input the street name, city name or house number.

There is a need for an improved method of inputting a destination in a navigation system that would minimize the time required for the destination entry process.

SUMMARY

In view of the above, a method is provided for inputting a destination in a navigation system having an actuating device that is controlled by moving the actuating device using a plurality of motion types. In an example method, the actuating device is moved, or actuated, by using a first motion type to select from a plurality of menu items. The plurality of menu items include the following selectable items:
  a CHARACTER menu item that provides a list of characters when selected; and
  a DIGIT menu item that provides a list of digits when selected.

The first motion type may be used to actuate the actuating device to select the other one of the selectable menu items.

In another aspect of the invention, a navigation system is provided. The navigation system includes an actuating device for manually inputting a destination. The navigation system also includes a display for displaying a plurality of menu items selectable by actuating the actuating device using a first motion type. The display includes at least the selectable menu items:
  a CHARACTER menu item that provides a list of characters when selected;
  a DIGIT menu item that provides a list of digits when selected.

The display displays the selectable menu items that were not selected when one of the selectable menu items is selected. The actuating device is configured to select the selectable menu items that were not selected by actuating the actuating device using the first motion type.

Other devices, apparatus, systems, methods, features and advantages of the examples consistent with the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

Examples of systems and methods consistent with the invention are described below with reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
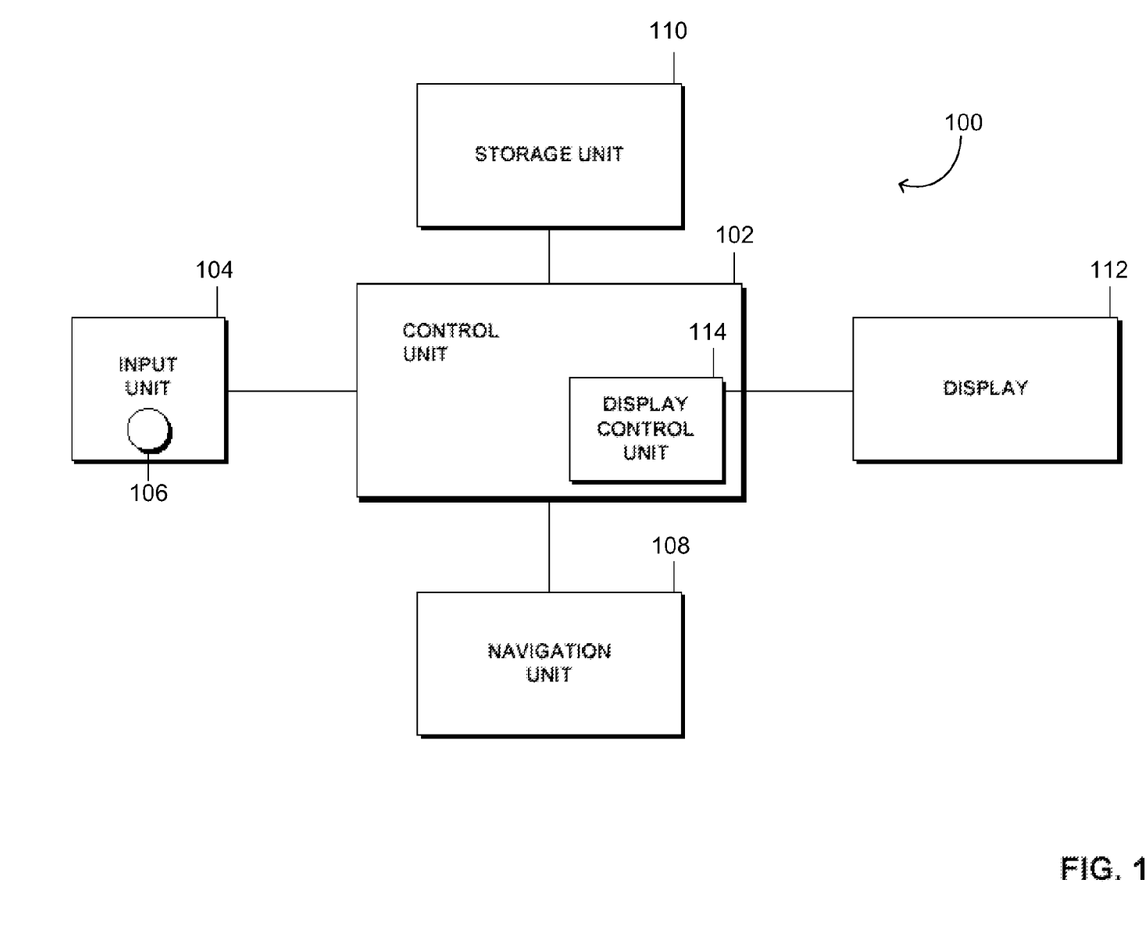
FIG. 1 is a block diagram of an example navigation system using example systems and methods for inputting a destination.

FIG. 1 is a block diagram of an example navigation system 100 using example systems and methods for inputting a destination. The navigation system 100 in FIG. 1 includes a main control unit 102 for controlling the overall functioning of the navigation system 100. The navigation system 100 includes an input unit 104 having several operating elements for controlling operating modes of the navigation system 100. The input unit 104 includes a face plate described further below with reference to FIG. 2 on which user input functions are presented to the user, which in the described example would typically be the driver of the vehicle in which the navigation system 100 operates.

The example navigation system 100 shown in FIG. 1 includes an actuating device 106 for inputting information such as data indicating the destination. The example navigation system 100 also includes a navigation unit 108 configured to calculate a route from the present vehicle location to the destination input by the user. The example navigation system 100 includes a storage unit 110, which may store map data that may be used to calculate a route. The example navigation system 100 may also include a display 112 for informing the driver of the operating status of the navigation system 100. In the example navigation system 100 in FIG. 1, the display 112 may be used for showing and selecting the different elements (such as characters and/or digits) needed to input an address or a city. The control unit 102 includes a display control unit 114 to control the way information is displayed to the user in response to the actuation of the actuating device 106 by the user.

Figure 2:
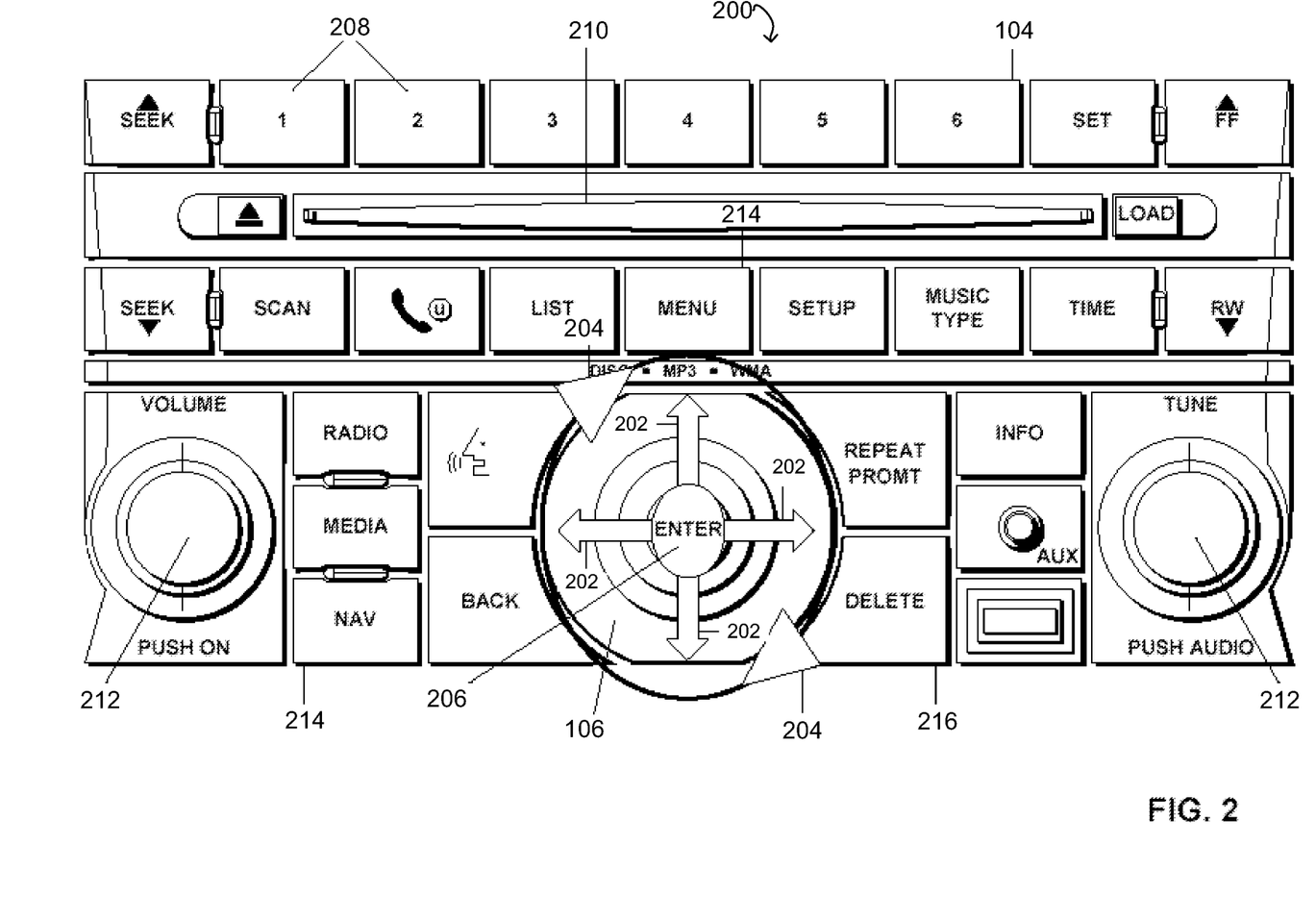
FIG. 2 is a front view of an input unit of the example navigation system in FIG. 1 having an actuating device for inputting a destination.

FIG. 2 is a front view, or a face plate 200, of the input unit 104 of the example navigation system 100 in FIG. 1 having an actuating device 106 for inputting a destination. The input unit 104 includes the actuating device 106, which as shown in FIG. 2 is a four-way joystick with movements in the directions up, down, right and left indicated by arrows 202. The actuating device 106 includes a central part 206. As described below with reference to FIGS. 3-5, the movements of the joystick to actuate the actuating device 106 correspond to a first motion type. It is also possible to actuate the actuating device 106 using a second motion type, which is a rotation motion as indicated by the arrows 204. The actuating device 106 may be rotated either clockwise or counter-clockwise by 360°. The central part 206 of the actuating device 106 includes lettering that spells out the word 'ENTER,' indicating that the user may press the actuating device 106 by pushing the central part 206 as represented by the circle. The actuating device 106 can be a one-piece device that uses the first, second and third motion types. In another example, the actuating device 106 may contain several separated pieces, by way of example, the four-way joystick for the movement in the four different directions, a center push button 206 and an outer ring allowing the rotation in a clockwise and counter-clockwise direction.

The navigation system 100 (in FIG. 1) described with reference to FIGS. 1-5 may be integrated, or operate within, a multi-module, multimedia electronic system similar to a systems typically found in vehicles. The electronic system may include, in addition to the navigation system 100, a radio module, an audio module, a telecommunication module, and any other module that provides a user with functional features. Referring to FIG. 2, the face plate 200 may provide user interface devices for controlling the different operating modes of the electronic system. For example, the face plate 200 may include a plurality of buttons or hardkeys that effect operation of the different modules that make up the electronic system.

In the face plate 200 in FIG. 2, a first plurality of buttons 208 numbered from 1 to 6 are mounted on an upper edge of the face plate 200. The buttons 208 may be of a type used for selecting different radio stations or tracks on an audio or video disk that may be inserted into the system through a disk-mounting opening 210. The face plate 200 also includes two turn-press buttons 212 that may be used as a power switch for turning the system on, for controlling the audio system volume, for tuning the radio receiver when the electronic system is functioning in a radio receiver operating mode. The face plate 200 in FIG. 2 also includes a second plurality of buttons or hardkeys 214 to enable other functions associated with the different modules in the electronic system. For example, the plurality of buttons 214 includes a radio button, which may be used to switch the electronic system to a radio mode in which the radio operations are made available to the user. The plurality of buttons 214 are labeled to denote the function associated with each button. The functions provided by the plurality of buttons 214 are typical of electronic systems operating in vehicles and largely unrelated to inputting destination information in the navigation system. Further description is therefore unnecessary.

As illustrated in FIG. 2, the face plate 200 may also include a DELETE button 216. The DELETE button 216 may be used in connection with the navigation system to allow a user to delete an entered element, character or digit.

Figure 3:
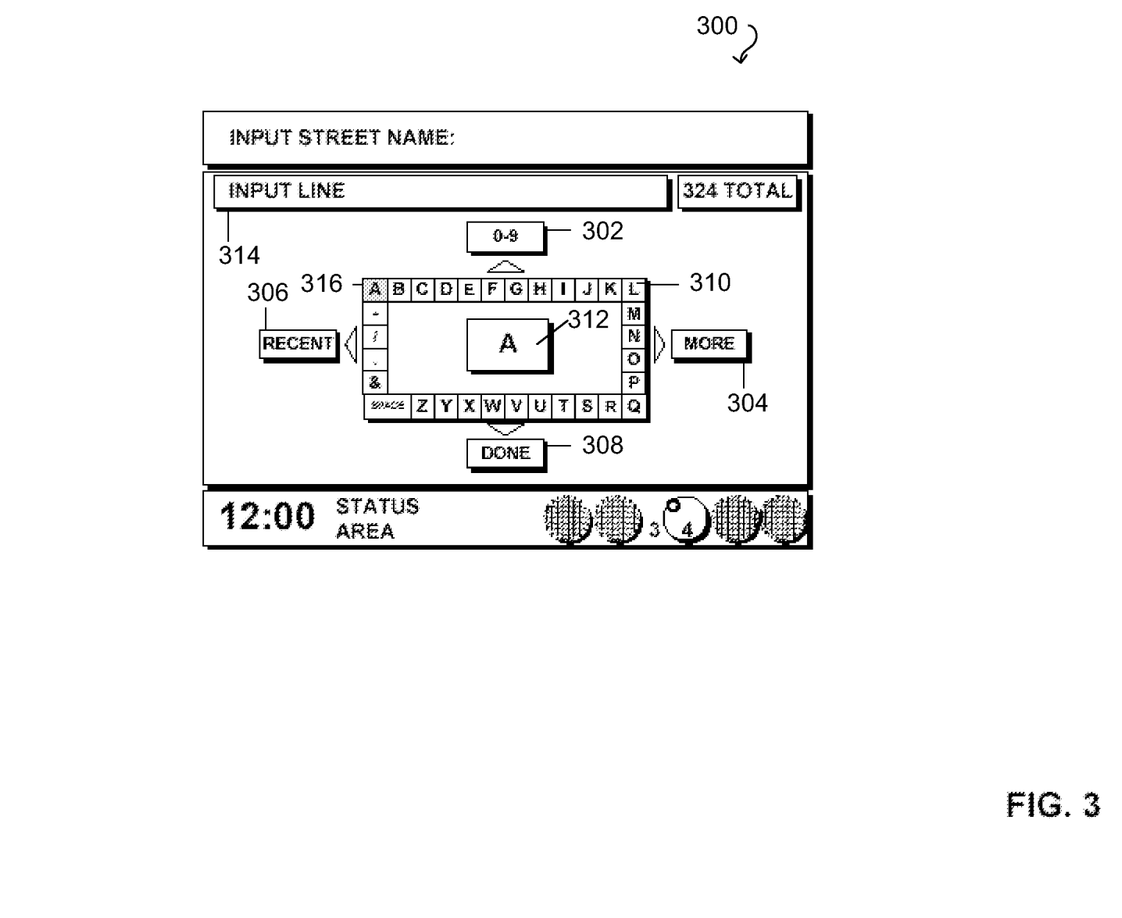
FIG. 3 is a front view of a display showing an example display when a CHARACTER menu item has been selected by the user.
Figure 4:
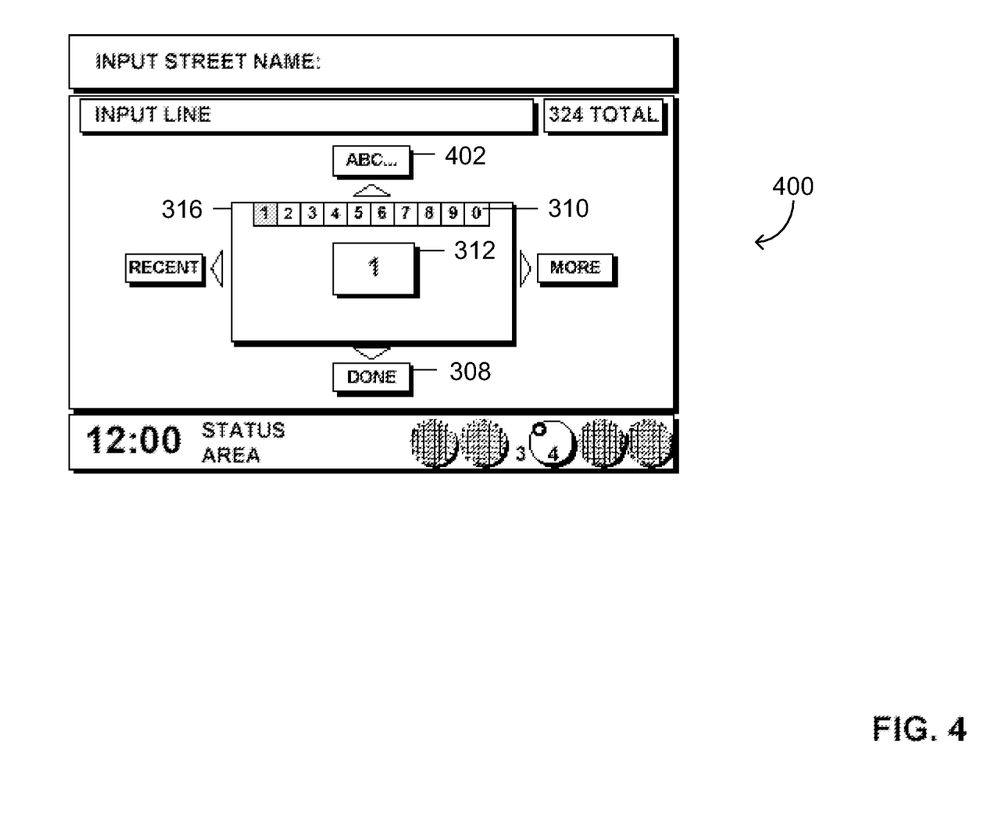
FIG. 4 is a front view of a display showing an example display when a user has selected the DIGIT menu item.
Figure 5:
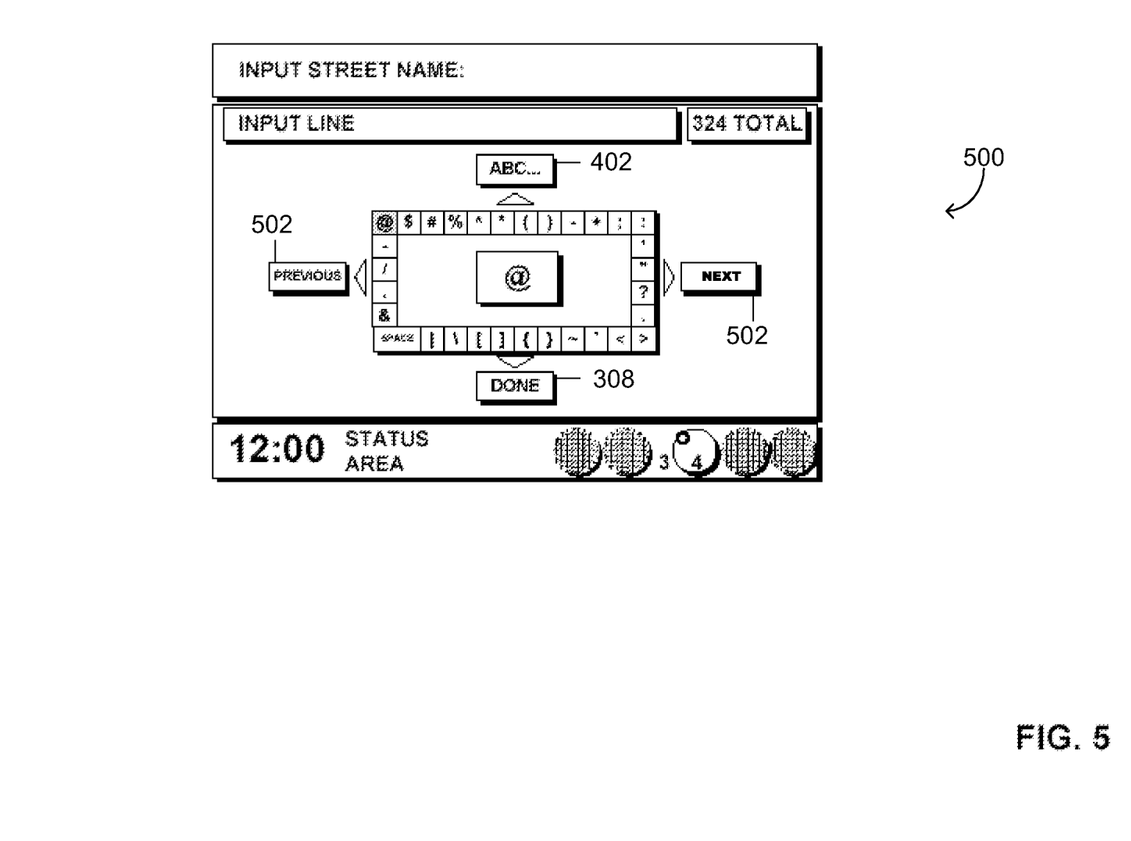
FIG. 5 is a front view of a display showing an example display when the MORE menu item of FIG. 3 is selected.

FIGS. 3-5 illustrate examples of display views that may appear when the actuating device 106 is actuated to enter a navigation destination. The display views in FIGS. 3-5 illustrate operation of an example method for inputting a destination using the actuating device 106. In most North American and European countries, the elements needed to input a destination include alphabetical characters A-Z, digits 0-9 and punctuation and accent characters. These elements may be, for example, represented by the ISO 8859 character set. To facilitate the spelling of a destination, the elements may be divided into several groups represented by menu items having menu item selectors shown on the display. The menu items may be selected by the user by moving the actuating device 106 using the first motion type, which is, as described above with reference to FIG. 2, is motion in the operating element up, down, to the left or to the right. The actuating device 106 is moved in the direction of a menu item selector. In one example method, the menu items may be identified by selectors, or softkeys, or software buttons. The CHARACTER menu item may be identified by a CHARACTER menu item selector 402 in FIG. 4. The CHARACTER menu item selector 402 provides access to selection of the alphabetical characters and to other punctuation when the CHARACTER menu item selector 402 is selected. For example, FIG. 3 shows an example of a display view 300 presented when the CHARACTER menu item selector 402 has been selected by the user. In the example illustrated in FIG. 3, the user selected the CHARACTER menu item selector 402 by moving the actuator device 106 up (according to the first motion type) when the system is in an operating state as shown in FIG. 4 or 5.

The menu items may also include a DIGIT menu item selectable using a DIGIT menu item selector 302 in FIG. 3 to provide access to the digits from 0-9. FIG. 4 shows a display view 400 presented when the DIGIT menu item selector 302 (in FIG. 3) is selected. Selection of the DIGIT menu item selector 302 may be effected using the same first motion type used to select the CHARACTER menu item selector 402. In the illustrated example, the actuating device 106 is moved in the same direction (up) to select the two menu items.

Typically, displays in electronic systems have limited screen space and not all characters may be displayed when the CHARACTER menu item selector 402 is selected. The menu items may also include a MORE menu item, which is selectable with a MORE menu item selector 304 as shown in FIG. 3. The MORE menu item may provide access to the punctuation and accent characters or any other elements needed when the MORE menu item selector 304 is selected by actuating the actuating device 106 using the first motion type. In the illustrated example, the MORE menu item selector 304 is selected by moving the actuating device 106 to the right. FIG. 5 shows an example display view 500 of the display presented when the MORE menu item selector 304 is selected when the system is in the operating state shown in FIG. 3.

The display view 300 in FIG. 3 and the display view 400 in FIG. 4 include a RECENT menu item selectable with a RECENT menu item selector 306. The RECENT menu item provides a list of previously entered text appropriate to the speller in use when selected. The list may be of previously entered cities or destinations, or portions of destination names and/or addresses. The display view 300 in FIG. 3 also includes a DONE menu item selectable with a DONE menu item selector 308. The DONE menu item allows the user to indicate that a complete input has been entered. The lists that may be displayed using the RECENT menu item selector 306 may be longer than the number of items that can be displayed on the display. The MORE menu item, which is selectable with a MORE menu item selector 304 (in FIG. 3), may be used to provide access to additional lists that may be displayed by selecting the corresponding NEXT and PREVIOUS menu item selectors 502 as shown in FIG. 5. Selection of the RECENT menu item selector 306, and of the NEXT menu item selectors 502 may be effected by moving the actuating device 106 using the first motion type, which in the examples illustrated is to the right or left.

As described with reference to FIGS. 3-5, the different menu items may be selected by moving the actuating device 106 in the direction of the desired menu item selector using the first motion type (up, down, right, left). More specifically, for example, when the system is in the operating state shown in FIG. 3, digits may be accessed by moving the actuating device 106 up towards the DIGITS menu item selector 302 on the display view 300. The RECENT menu item selector 306 may be selected by moving the actuating device 106 to the left. The MORE menu item selector 304 may be selected by moving the actuating device 106 to the right. When the user has completed entry of the text identifying the destination, the user may move the actuating device 106 down to select the DONE menu item selector 308.

The first motion type may effect selection of the menu item in at least two different ways. The actuating device 106 may be moved firmly in the corresponding direction to effect a selection. This way of selecting may result in inadvertent selections by inadvertent movements of the actuating device 106. In one example, inadvertent selections may be tolerated and selection of a menu item may be effected by moving the actuating device 106 in the intended direction for selecting the menu item and for selecting a different display status. Inadvertent movements of the actuating device 106 would less likely affect the central part 206, which is actuated by pressing (the third motion type described above). In another, more accidental press resistant, example, selection of the menu item may be effected by pressing the ENTER button in the central part 206 to confirm the movement of the actuating device 106 to the different direction.

As shown in FIGS. 3-5, the different menu items are displayed in each operating state, and the menu items may be selected by moving the actuating device 106 in the direction where the corresponding menu item is displayed. The PREVIOUS menu item may not be visible such as, for example, when the user is in the first additional list of the MORE menu item. Once one of the menu items has been selected, the different elements contained in the list of the menu item are displayed in a rectangle 316 as shown in FIGS. 3-5. The different elements are displayed at the outer edge of the rectangle 316. As shown in FIGS. 3 and 5, the selected menu items include enough elements to fill the entire circumferential part of the rectangle 316 with different elements 310. The display view 400 of the DIGIT menu item in FIG. 4 includes ten elements 310, which is insufficient to fill the entire circumference of the rectangle 316 with elements.

When the user selects one of the menu items, a first predetermined element may be selected as a starting element. The selected starting element may be indicated in a central display region 312 in large letters. For example, the selected starting element for the display view 300 of the CHARACTER menu item in FIG. 3 is the letter 'A' in the central display region 312. The other elements may be accessed by rotating the actuating device 106. Rotation in the illustrated example is the second motion type. As the actuating device 106 is rotated, elements in the list are presented for selection. The actuating device 106 may be rotated continuously and indefinitely highlighting each presented element in a continuous circle through the different elements 310.

When the system is in an operating mode illustrated by the display view 300 in FIG. 3, the different characters may be selected by rotating the actuating device 106 (in FIG. 1) and each presently selected element is presented in the central display region 312. Selection of an element, such as a character may be confirmed by pressing the actuating device 106, which is an example of the third motion type. The selected characters may be displayed as they are confirmed in an input line 314 on the display.

In the example display view 300 in FIG. 3, the different elements of the list are arranged in the rectangle 316. It is to be understood that any other form may be used for displaying the different elements, such as a circle or a triangle or polygon for example. When the user is selecting different characters by rotating the actuating device 106, the user may change to the DIGIT menu item by moving the actuating device 106 up in the example shown in FIG. 3. The example display view 300 in FIG. 3, which is the display view 300 presented when the CHARACTER menu item selector 402 (in FIG. 4 and FIG. 5) is selected, shows selectors for selecting four menu items: the RECENT menu item selector 306, the DONE menu item selector 308, the MORE menu item selector 304, and the DIGIT menu item selector 302. The RECENT menu item provides a list of previously used destinations, the DIGIT menu item provides access to the digits, the MORE menu item provides access to the punctuation and accent characters, and the DONE menu item allows for user selected completion of the input of the text.

FIG. 4 shows an example display view 400 presented when the user has selected the DIGIT menu item selector 302, which is shown in the upper part of the display view 300 in FIG. 3. The display view 300 in FIG. 3 shows a predetermined digit in the central display region 312 in large letters indicating the currently selected digit. The digits may be selected by rotating the actuating device 106. The user may return to the display view 300 of the CHARACTER menu item as shown in FIG. 4 by moving the actuating device 106 up to the CHARACTER menu item selector 402 in FIG. 4. The user may terminate the input of text by moving the actuating device 106 downward. The user may access the MORE menu item to access the punctuation and accent characters by moving the actuating device 106 to the right. The user may move the actuating device to the left to display a list of previously entered destinations or text.

FIG. 5 shows the display view 500 presented when the user selects the MORE menu item selector 304 in the display view 300 in FIG. 3. The MORE menu item may include several lists of additional characters that may be accessed by moving the actuating device 106 to the left or to the right for accessing the previous or the next list. The DONE menu item can be selected by a downward movement of the actuating device toward the DONE menu item selector 308. The user may return to the CHARACTER menu item by moving the actuating device 106 up towards the CHARACTER menu item selector 402.

The face plate 200 in FIG. 2 may also include a way to delete an entered element, character or digit. For example, an entered character or any other confirmed element may be deleted by pressing a hardkey DELETE button 216 on the face plate 200 of the input unit 104 as shown in FIG. 2.

Figure 6:
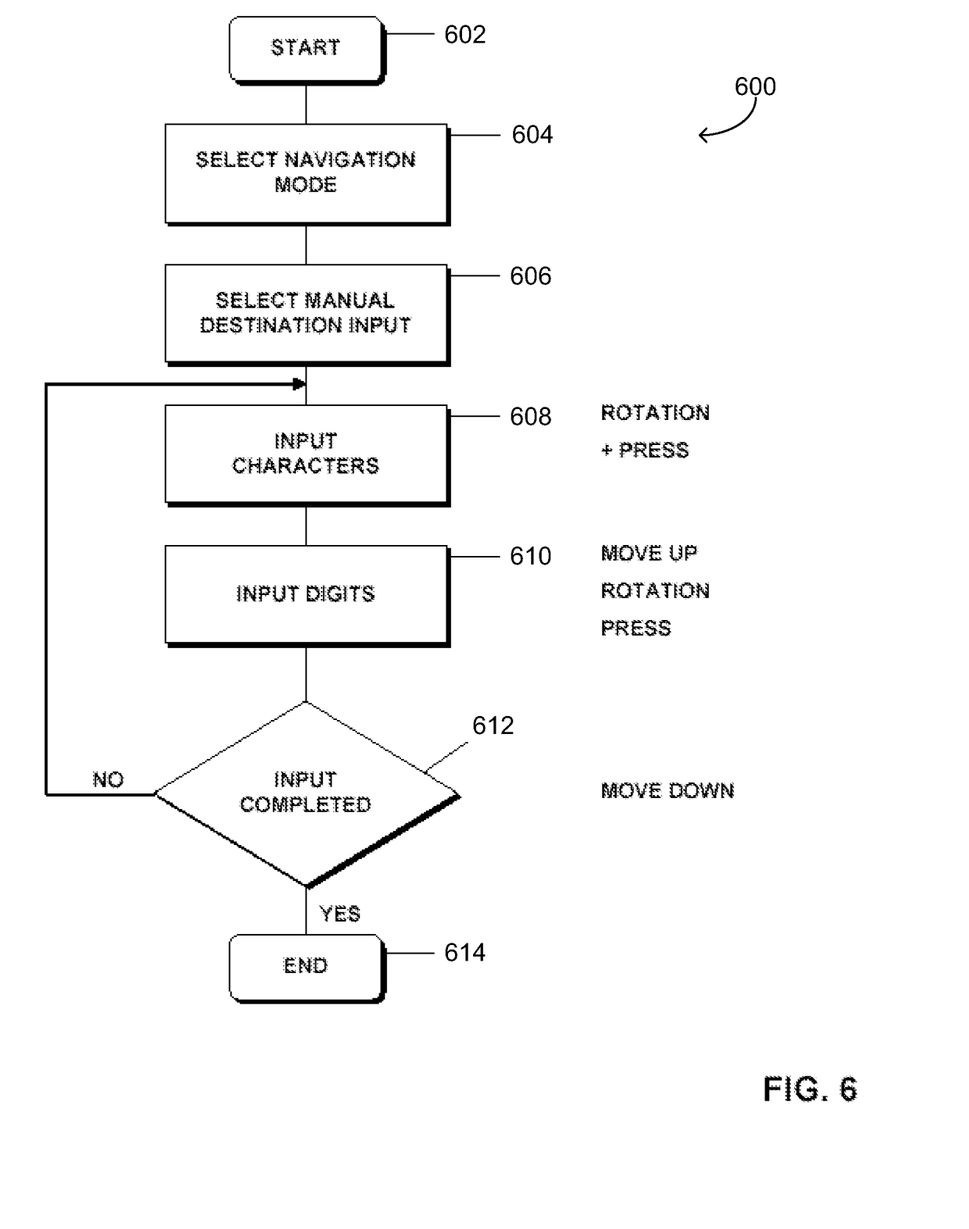
FIG. 6 is a flowchart depicting operation of an example method for inputting a destination.

FIG. 6 is a flowchart 600 depicting operation of an example method for inputting a destination in a navigation system. The example method illustrated may be performed using the navigation system 100 in FIG. 1.

The operating steps of the actuating device 106 are shown to the right of the flowchart 600 in FIG. 6. The method illustrated by the flowchart 600 starts at step 602. When the user invokes operation of the navigation system to be guided to a predetermined destination, the system switches to a navigation mode at step 604. In one example, the navigation mode may be invoked by actuating a hardkey on the face plate 200 (in FIG. 2) of the input unit 104 (in FIG. 1). At step 606, the navigation system may be switched to a mode for manual input of a destination. Manual input of the destination may be affected by selecting a menu item from the menu item selectors shown on the display or by pressing a hardkey or by any other method. At step 608, the user may begin spelling the destination. For example, the user may start to enter a street name or a city name. The user may select the CHARACTER menu item selector 402 (in FIG. 4), which may be done in many different ways. From the CHARACTER menu item, the user selects different characters to input at step 608. The user may make character selections by rotating the actuating device 106 until the desired characters are selected. The display view 300 shown in FIG. 3 shows the character 'A' as currently selected. If the character 'G' is desired, the user may turn the actuating device 106 to the right until the letter 'G' is reached. If the character 'Z' is desired, the user may turn the actuating device 106 in the counter-clockwise direction to reach the character faster. Once the user has reached the desired character, selection of the character may be confirmed by pressing the actuating device 106. The user may input a digit by moving the actuating device 106 up to select the DIGIT menu item selector 302. Digits may be input at step 610 by rotating the actuating device 106 and by pressing the actuating device 106 for confirmation. At decision block 612, the user is asked whether the input is complete. If input is not complete, the user may continue to input characters or any other elements. The user may move the actuating device 106 down so that the DONE menu item is selected indicating that the entry of text is completed. The method ends at step 614 if entry of text is complete. If not complete, the user continues with steps 608, 610 and 612.

The above-described examples of methods and systems for inputting a destination in a navigation system may include a display designed so that different ways of entering elements are designed around the capabilities of the actuating device 106. For example, the rotational and joystick motions are used for the selection of characters. The actuating device 106 may also be used to provide rapid access to recently entered text, the full set of available characters and the completion of the entered text.

The above-described example systems and methods, the alphabet, the digits and punctuation characters are accessible with a minimal number of keystrokes. The DIGIT menu item has minimal keystroke access to the CHARACTER menu item, punctuations and recent text input.

It will be understood, and is appreciated by persons skilled in the art, that one or more processes, sub-processes, or process steps described in connection with FIGS. 1-6 may be performed by hardware and/or software. If the process is performed by software, the software may reside in software memory (not shown) in a suitable electronic processing component or system such as, one or more of the functional components or modules schematically depicted in FIG. 1. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" and/or "signal-bearing medium" is any means that may contain, store, communicate, propagate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for inputting a destination in a navigation system that is controlled by moving an actuating device using a plurality of motion types, the plurality of motion types being provided by a single actuatable element of the actuating device, the method comprising:
    displaying a plurality of selectable menu items on a display;
    a step of actuating the actuating device using a first motion type to select from the plurality of selectable menu items, the plurality of selectable menu items including:
        a CHARACTER menu item that provides a list of characters when selected; and
        a DIGIT menu item that provides a list of digits when selected;
    where a first list of elements is the list of characters and a second list of elements is the list of digits and the first motion type includes moving the actuating device in different directions along a plane;
    displaying the first list of elements when the CHARACTER menu item is selected and displaying the second list of elements when the DIGIT menu item is selected in the step of actuating using the first motion type;
    a step of actuating the actuating device using a second motion type to select an element from a displayed list of elements corresponding to a selected menu item of the plurality of selectable menu items, the second motion type being different than the first motion type and the second motion type including a rotation of the actuating device;

displaying the selected element in a central part of the display and at least some elements that are not selected by the second motion type in an area around the selected element, at least some of the plurality of selectable menu items that are not selected by the actuating device using the first motion type being displayed radially outside the at least some elements that are not selected;

a step of actuating the actuating device using a third motion type to confirm the selected element made by actuating the actuating device using the second motion type, the third motion type being different than the first motion type and the second motion type, the third motion type including moving the actuating device in a direction substantially perpendicular to the plane in which the actuating device is moved using the first motion type, and the first motion type, the second motion type, and the third motion type being provided by a single actuatable element of the actuating device;

selecting another menu item by moving the actuating device using the first motion type in a direction corresponding with a displayed direction to the another menu item on the display;

repeating the step of actuating the actuating device using the first motion type, the step of actuating the actuating device using the second motion type, and the step of actuating the actuating device using the third motion type to add selected elements to an input; and confirming input of the selected elements as entered text to indicate the inputted destination.

2. The method of claim 1 where the plurality of selectable menu items further includes: a RECENT menu item that provides a third list of previously entered text when selected; and a MORE menu item that provides a fourth list of additional characters not contained in the CHARACTER menu item when selected; and the method further comprising displaying the third list of previously entered text when the RECENT menu item is selected and the fourth list of additional characters when the MORE menu item is selected in the step of actuating using the first motion type.

3. The method of claim 1 where the plurality of selectable menu items further includes a DONE menu item, the method further comprising:
actuating the actuating device using the first motion type to select the DONE menu item; and
confirming input of the entered text as indication of the inputted destination upon selection of the DONE menu item.

4. The method of claim 1 where the step of actuating the actuating device using the first motion type includes moving the actuating device in four different directions to select from four other non-selected menu items.

5. The method of claim 1 further comprising:
confirming selection of one of the plurality of selectable menu items by actuating the actuating device using the third motion type.

6. The method of claim 2 where, when the MORE menu item is selected using the first motion type, the plurality of selectable menu items for actuating the actuating device using the first motion type includes:
a NEXT menu item containing a list of additional characters;
the CHARACTER menu item; and
the DONE menu item; and
where the method further includes using the first motion type to actuate the actuating device to select one of the other of the plurality of selectable menu items when the MORE menu item has been selected.

7. The method of claim 1 further comprising: displaying a starting element of a list of elements corresponding to a selected menu item of the plurality of selectable menu items in the central part of the display; and displaying other elements in the list of elements corresponding to the selected menu item in an area of the display around the central part.

8. The method of claim 7 further comprising:
displaying a plurality of selectable menu items not selected by actuating the actuating device using the first motion type radially outside the other elements in the list of elements corresponding to the selected menu item that are displayed around the element displayed in the central part.

9. A navigation system comprising:
an actuating device for manually inputting a destination, the actuating device configured to actuate using a plurality of motion types including a first motion type, a second motion type, and a third motion type, the first motion type being different from the second motion type and the third motion type being different from the first motion type and the second motion type, and the plurality of motion types being provided by a single actuatable element of the actuating device;
a display hardware including a display configured to display a plurality of menu items selectable by actuating the actuating device using the first motion type, the plurality of menu items including:
a CHARACTER menu item that provides a first list of elements when selected; and
a DIGIT menu item that provides a second list of elements when selected,
where the first list of elements includes characters and the second list of elements includes digits and the first motion type includes moving the actuating device in different directions along a plane;
where the display is configured to display the first list of elements when the CHARACTER menu item is selected and the second list of elements when the DIGIT menu item is selected, and
the actuating device is configured to select, by using the second motion type, a given element in a displayed list of elements corresponding to a menu item of the plurality of menu items that is selected when the actuating device is actuated using the first motion type, the second motion type including a rotation of the actuating device; and
a processor comprising a display control unit configured to control the display, the display control unit configured to display the given element of the displayed list of elements in a central part of the display and at least some elements that are not selected by the second motion type in an area around the given element, at least some of the plurality of menu items that are not selected by the actuating device using the first motion type being displayed radially outside the at least some elements that are not selected;
where the actuating device is configured to confirm, by using the third motion type, the selected given element made by actuating the actuating device using the second motion type, the third motion type including moving the actuating device in a direction substantially perpendicular to the plane in which the actuating device is moved using the first motion type;
where the actuating device is further configured to select another menu item from among the plurality of menu items that were not selected in response to actuation of the actuating device using the first motion type in response to movement in a direction corresponding with a displayed direction on the display toward the another menu item; and where the actuating device is configured to confirm input of selected elements as entered text to indicate the inputted destination.

10. The navigation system of claim 9 where the actuating device is a four-way actuating device configured to be moved in four different directions in a plane.

11. The navigation system of claim 9 where the actuating device is configured to be rotated clockwise and counter-clockwise.

12. The navigation system of claim 9 where the display is adapted to display a second set of selectable menu items including:
   a NEXT menu item that displays a list of additional characters when selected;
   a RECENT menu item that displays a list of previously entered text when selected;
   a MORE menu item that displays a list of additional characters not contained in the CHARACTER menu item when selected; and
   a DONE menu item that confirms input of the entered text to indicate the inputted destination when selected.

* * * * *